United States Patent
Seo et al.

(10) Patent No.: US 10,405,285 B2
(45) Date of Patent: Sep. 3, 2019

(54) METHOD FOR DETERMINING TRANSMIT POWER FOR DIRECT DEVICE TO DEVICE COMMUNICATION IN WIRELESS COMMUNICATION SYSTEM AND APPARATUS THEREFOR

(71) Applicant: LG ELECTRONICS INC., Seoul (KR)

(72) Inventors: Hanbyul Seo, Seoul (KR); Byounghoon Kim, Seoul (KR); Joonkui Ahn, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/305,062

(22) PCT Filed: Apr. 15, 2015

(86) PCT No.: PCT/KR2015/003778
§ 371 (c)(1),
(2) Date: Oct. 18, 2016

(87) PCT Pub. No.: WO2015/163638
PCT Pub. Date: Oct. 29, 2015

(65) Prior Publication Data
US 2017/0188316 A1    Jun. 29, 2017

Related U.S. Application Data

(60) Provisional application No. 62/027,260, filed on Jul. 22, 2014, provisional application No. 61/981,846, filed on Apr. 20, 2014.

(51) Int. Cl.
*H04W 52/36* (2009.01)
*H04W 24/10* (2009.01)
(Continued)

(52) U.S. Cl.
CPC ......... *H04W 52/367* (2013.01); *H04W 24/10* (2013.01); *H04W 52/36* (2013.01);
(Continued)

(58) Field of Classification Search
CPC . H04W 52/367; H04W 48/16; H04W 52/346; H04W 52/383; H04W 56/0015;
(Continued)

(56) References Cited

U.S. PATENT DOCUMENTS

2013/0295983 A1* 11/2013 Kim .................... H04W 52/146
                                                                                 455/522
2013/0324182 A1* 12/2013 Deng .................. H04W 52/281
                                                                                 455/522
(Continued)

FOREIGN PATENT DOCUMENTS

CN      102404837      4/2012
CN      103596258      2/2014
(Continued)

OTHER PUBLICATIONS

PCT International Application No. PCT/KR2015/003778, Written Opinion of the International Searching Authority dated Jul. 22, 2015, 16 pages.
(Continued)

*Primary Examiner* — Shaima Q Aminzay
(74) *Attorney, Agent, or Firm* — Lee, Hong, Degerman, Kang & Waimey

(57) ABSTRACT

Disclosed is a method for performing, by a device, power reporting to a base station for a direct device to device communication in a wireless communication system. Specifically, the method comprises the steps of: receiving a transmit power control (TPC) command for a direct device to device communication from the base station; sending a direct device to device communication signal by determin-
(Continued)

ing the transmit power of a direct device to device communication according to the TPC command; and reporting the difference between the determined transmit power and a certain power to the base station.

6 Claims, 11 Drawing Sheets

(51) Int. Cl.
*H04W 72/04* (2009.01)
*H04W 52/38* (2009.01)
*H04W 88/02* (2009.01)
*H04W 88/12* (2009.01)

(52) U.S. Cl.
CPC ....... *H04W 52/365* (2013.01); *H04W 52/383* (2013.01); *H04W 72/0473* (2013.01); *H04W 88/02* (2013.01); *H04W 88/12* (2013.01)

(58) Field of Classification Search
CPC ......... H04W 72/0473; H04W 72/0406; H04W 76/025; H04W 88/02; H04W 88/04; H04W 88/12; H04W 8/005
USPC ........................................................ 455/522
See application file for complete search history.

(56) References Cited

U.S. PATENT DOCUMENTS

| | | | | |
|---|---|---|---|---|
| 2014/0094213 | A1* | 4/2014 | Khoshnevis | H04W 52/383 455/522 |
| 2015/0156730 | A1* | 6/2015 | Zhou | H04W 52/146 455/501 |
| 2015/0319724 | A1* | 11/2015 | Chae | H04W 8/005 370/315 |

FOREIGN PATENT DOCUMENTS

| | | |
|---|---|---|
| KR | 1020120112679 | 10/2012 |
| KR | 1020130008603 | 1/2013 |
| KR | 1020130052429 | 5/2013 |
| WO | 2013086362 | 6/2013 |

OTHER PUBLICATIONS

European Patent Office Application Serial No. 15783747.7, Search Report dated Oct. 25, 2017, 8 pages.
The State Intellectual Property Office of the People's Republic of China Application Serial No. 201580020535.8, Office Action dated Feb. 2, 2019, 11 pages.

* cited by examiner

FIG. 2
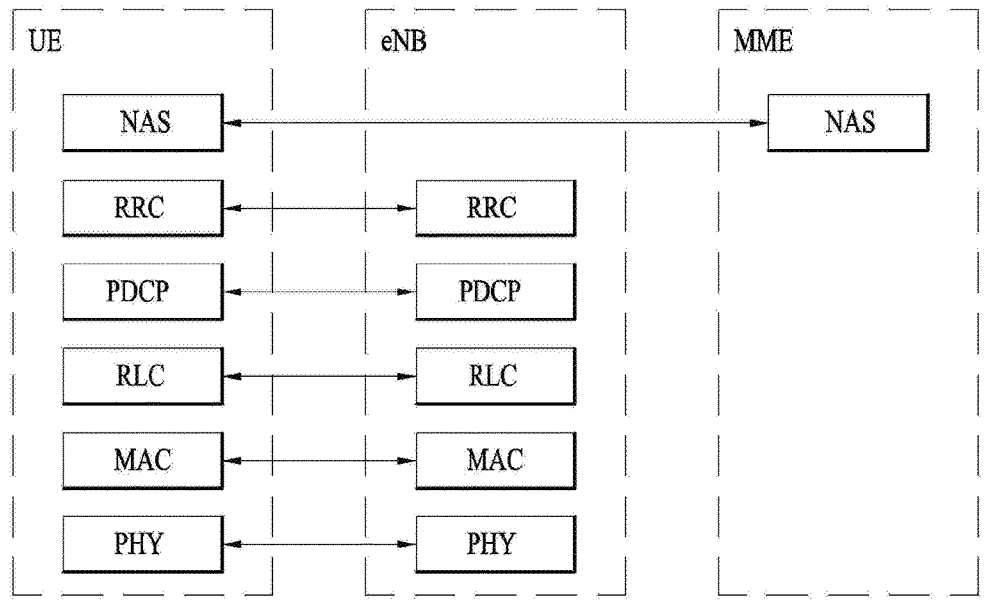
(a) CONTROL-PLANE PROTOCOL STACK
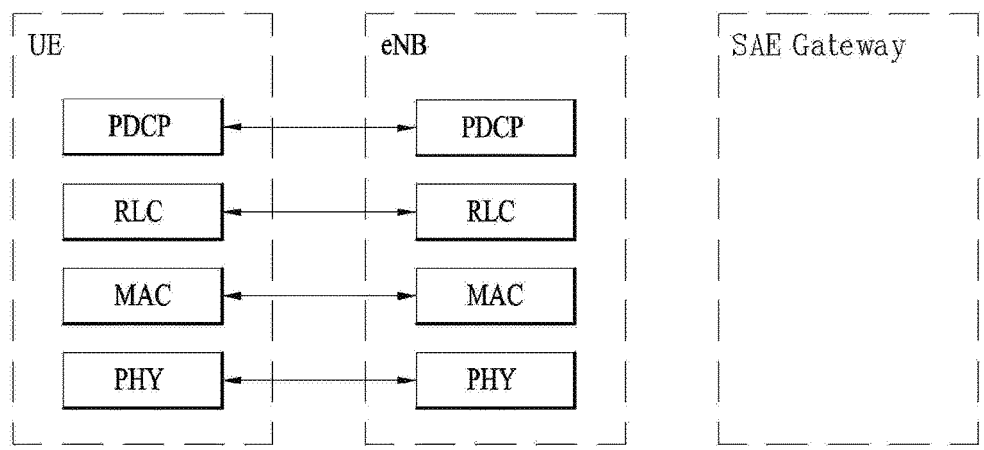
(b) USER-PLANE PROTOCOL STACK

METHOD FOR DETERMINING TRANSMIT POWER FOR DIRECT DEVICE TO DEVICE COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/003778, filed on Apr. 15, 2015, which claims the benefit of U.S. Provisional Application No. 61/981,846, filed on Apr. 20, 2014 and 62/027,260, filed on Jul. 22, 2014, the contents of which are all hereby incorporated by reference herein in their entirety.

TECHNICAL FIELD

The present invention relates to a wireless communication system, and more particularly, to a method for determining a transmission power for direct device to device communication in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the aforementioned discussion, an object of the present invention is to provide a method for determining a transmission power for direct device to device communication in a wireless communication system and an apparatus therefor.

Technical Solution

According to one embodiment of the present invention, a method for performing power reporting from a UE to an eNB for a direct device to device (D2D) communication in a wireless communication system comprises the steps of receiving a transmit power control (TPC) command for the direct D2D communication from the eNB; transmitting a D2D signal by determining a transmission power of the direct D2D communication in accordance with the TPC command; and reporting a difference between the determined transmission power and a specific power to the eNB.

Meanwhile, according to another embodiment of the present invention, a user equipment (UE) for performing direct D2D communication in a wireless communication system comprises a wireless communication module for transmitting and receiving a signal to and from another UE or an eNB; and a processor for processing the signal, wherein the processor controls the wireless communication module to transmit a D2D signal by determining a transmission power of the direct D2D communication in accordance with a transmit power control (TPC) command for the direct D2D communication, which is received from the eNB, and report a difference between the determined transmission power and a specific power to the eNB.

In the aforementioned embodiments, the specific power may be a minimum transmission power of the UE, or the specific power may be a minimum transmission power received from the eNB. In this case, the minimum transmission power received from the eNB is greater than the minimum transmission power of the UE.

Also, the TPC command indicates a power increase and decrease based on a current transmission power, and the power increase and decrease indicated by the TPC command for the D2D communication is greater than a power increase and decrease indicated by a TPC command for communication between the UE and the eNB.

In the embodiments, the report of the difference between the determined transmission power and the specific power to the eNB may be performed if the difference between the determined transmission power and the specific power is a threshold value or less.

Additionally, the TPC command may indicate a maximum transmission power of the direct D2D communication.

Advantageous Effects

According to the embodiment of the present invention, a synchronization signal for direct device to device communication can be transmitted and received more efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a UE and an E-UTRAN based on the 3GPP radio access network specification.

BEST MODE FOR CARRYING OUT THE INVENTION

Figure 1:
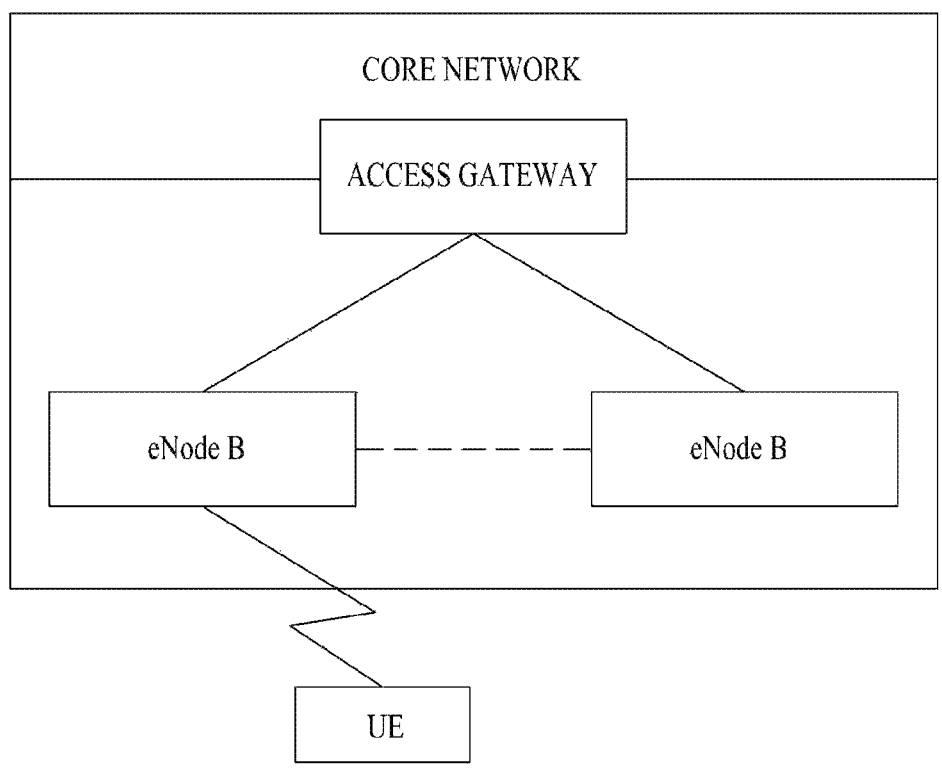
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A single cell consisting of an eNB is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
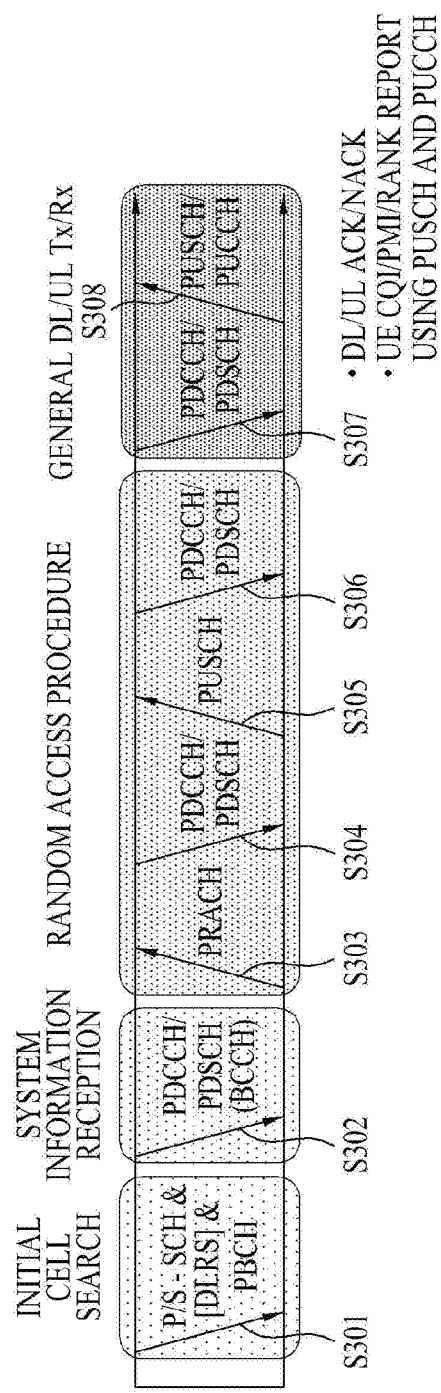
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
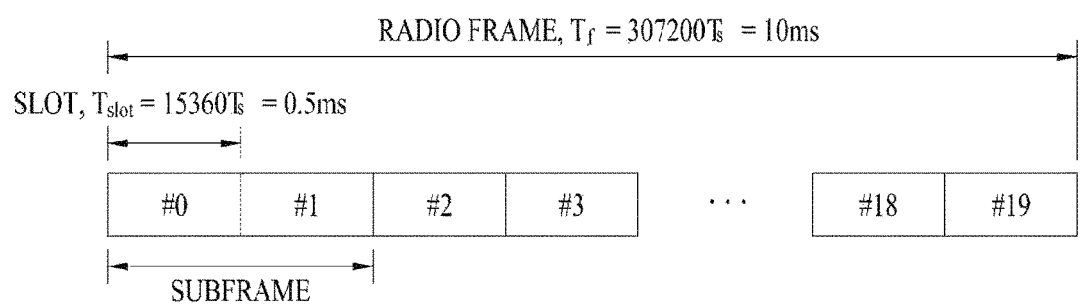
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
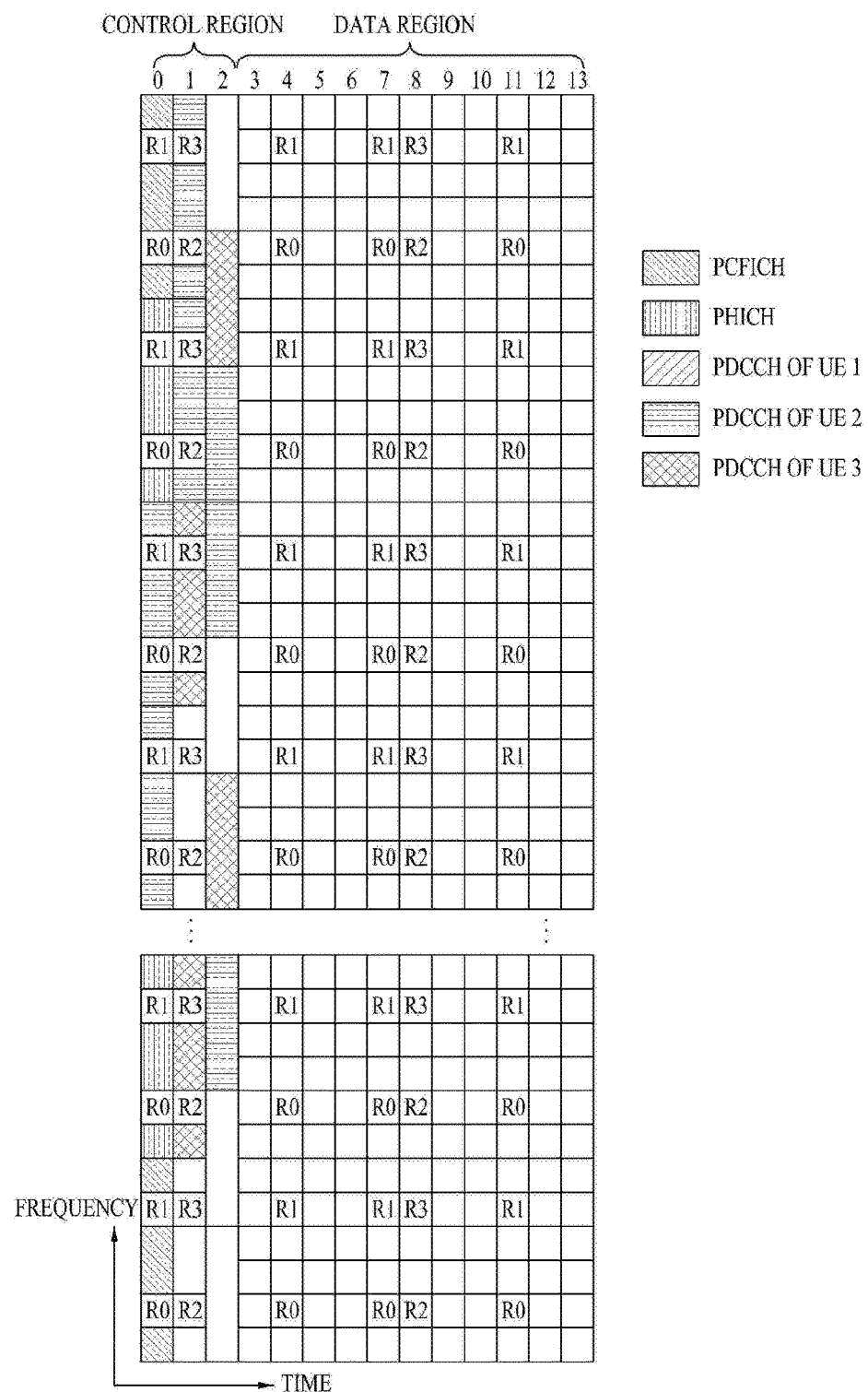
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
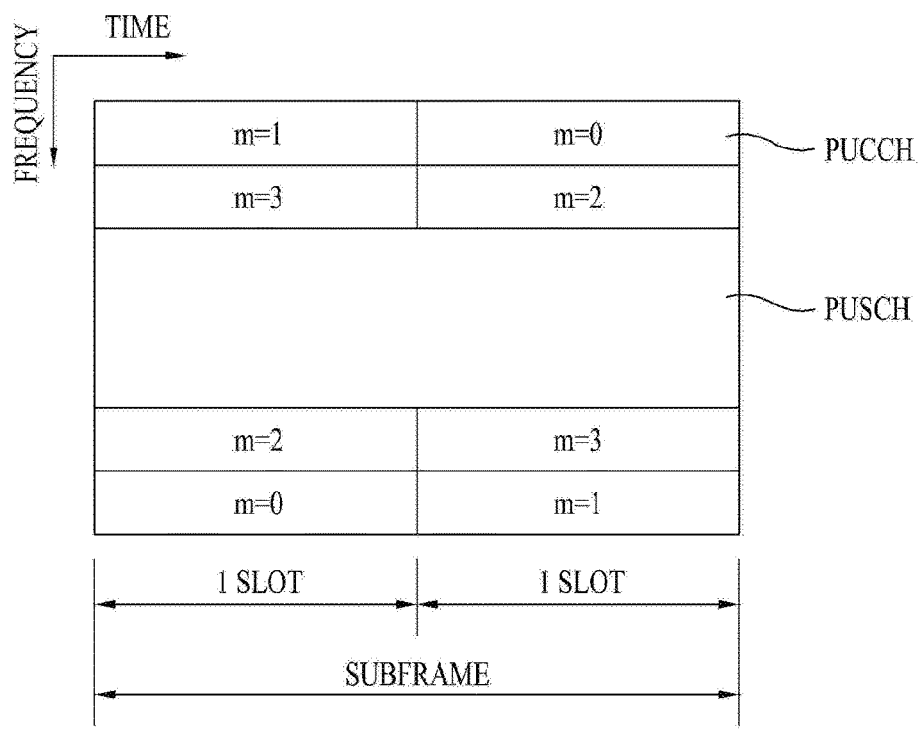
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min\left\{ \begin{array}{l} 10\log_{10}(\hat{P}_{CMAX,c}(i) - \hat{P}_{PUCCH}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ $P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when is 0 or 1 and $\alpha_c(j)=1$ when is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 1.

TABLE 1

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 2 or one of SET2 of Table 3, determined by a TPC-index parameter provided by the higher layer.

TABLE 2

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH, c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} [dBm] \quad \text{[Equation 3]}$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

$g^{(0)}=0$ when $P_{O\_UE\_PUCCH}$ is changed in the higher layer and $g(0)=\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 4 and 5 show $\delta_{PUCCH}$ indicated by a TPC command in DCI formats. Particularly, Table 4 shows $\delta_{PUCCH}$ indicated in DCI formats other than DCI format 3A and Table 5 shows $\delta_{PUCCH}$ indicated in DCI format 3A.

TABLE 4

| TPC Command Field in DCI format 1A/1B/1D/1/2A/2B/2C/2D/2/3 | $\delta_{PUSCH}$ [dB] |
|---|---|
| 0 | −1 |
| 1 | 0 |
| 2 | 1 |
| 3 | 3 |

TABLE 5

| TPC Command Field in DCI format 3A | $\delta_{PUSCH}$ [dB] |
|---|---|
| 0 | −1 |
| 1 | 1 |

The following Equation 4 relates to power control of a sounding reference signal (SRS) in an LTE system.

$$P_{SRS,c}(i) = \quad\quad\quad\quad\quad\quad\quad\quad\quad\quad\quad\quad\quad\quad\quad\text{[Equation 4]}$$

$$\min\left\{\begin{array}{l}P_{CMAX,c}(i)\\P_{SRS\_OFFSET,c}(m)+10\log_{10}(M_{SRS,c})+\\P_{O\_PUSCH,c}(j)+\alpha_c(j)\cdot PL_c+f_c(i)\end{array}\right\}[dBm]$$

In the above Equation 4, i is a subframe index, and c is a cell index. In this case, $P_{CMAX,c}(i)$ indicates a maximum transmission power of a UE, and $P_{SRS\_OFFSET,c}(m)$ is a value by a higher layer, wherein if m is 0, a periodic sounding reference signal is transmitted and if m is 0, an aperiodic sounding reference signal is transmitted. $M_{SRS,c}$ is a sounding reference signal bandwidth on a subframe index i of the serving cell c, and is expressed by the number of resource blocks.

$f_c(i)$ is a value indicating a current PUSCH power control adjustment state for the subframe index i of the serving cell c, and $P_{O\_PUSCH,c}(j)$ and $\alpha_c(j)$ are the same as described in the above Equations 1 and 2.

Figure 7:
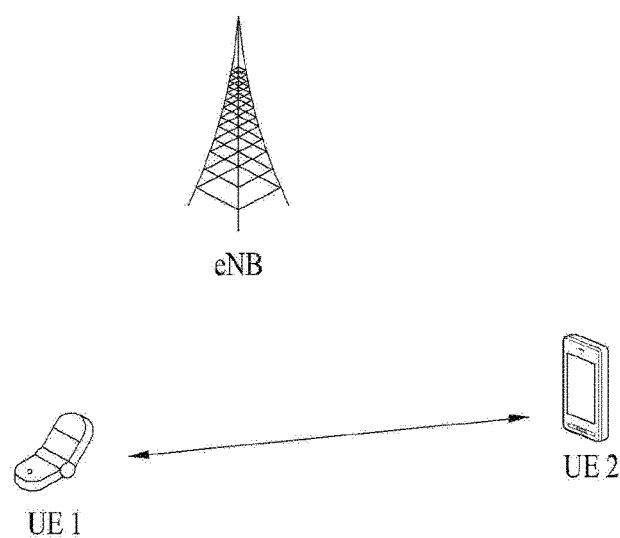
FIG. 7 is a conceptual diagram illustrating D2D communication.

FIG. 7 is a conceptual diagram illustrating direct D2D communication.

Referring to FIG. 7, during D2D communication (i.e., direct D2D communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

Since a UE uses uplink resources for performing transmission, D2D communication gives and takes interference to and from legacy communication (hereinafter, referred to as WAN communication) such as PUCCH or PUSCH transmitted from the UE to the eNB. Generally, WAN communication performs power control in accordance with a channel state with the eNB and its main purpose is to allow a WAN signal to reach the eNB at a minimum level by increasing a transmission power when a channel state with the eNB is not good. On the contrary, even in the case that D2D communication is performed within eNB coverage, since the eNB is not a target for receiving a signal, power control may not be appropriate in view of an aspect that quality of a received signal is assured. Particularly, power control may not be appropriate in case of broadcast or groupcast in which a plurality of UEs are receiving UEs of a D2D signal. It may be more appropriate that the eNB controls a D2D power to control interference between a WAN communication signal and a D2D communication signal.

That is, the eNB is basically configured to have wide coverage if possible based on receiving quality of the D2D signal without controlling a transmission power (for example, a maximum transmission power of D2D is configured), and if strong interference is observed from specific D2D communication, the eNB may command to reduce a power of the corresponding D2D communication through a TPC (transmit power control) command. If interference affecting another WAN communication from the specific D2D communication is sufficiently low, the eNB may command to increase a transmission power.

In performing this operation, minimum coverage of D2D communication should be assured. To this end, the eNB may configure a minimum D2D transmission power. The minimum D2D transmission power may have a value higher than that of a minimum power that may be applied by the UE to signal transmission. Also, a power lower than the minimum D2D transmission power may be used when the D2D signal is transmitted. This means that minimum throughput of D2D communication is not assured, and as a result, may be construed that time/frequency resources used by the corresponding D2D signal are wasted. Therefore, even though the eNB commands to reduce a D2D transmission power through the TPC command, if the transmission power based on the TPC command becomes a minimum transmission power or less configured by the eNB, the minimum power configured by the eNB not the power value based on the TPC command may be used.

Particularly, this operation may be effective if the eNB uses an accumulated TPC command for commanding a transmission power to increase or reduce as much as a certain level based on a current value. Distinctively, since coverage of a D2D communication channel is varied depending on a modulation and coding scheme (MCS) used by a corresponding channel, the number of RBs which are used, and the number of times for repeated transmission of the same data, the minimum D2D transmission power may be configured to have different values in accordance with the MCS, the number of RBs, and/or the number of times for repeated transmission of the same data.

Figure 8:
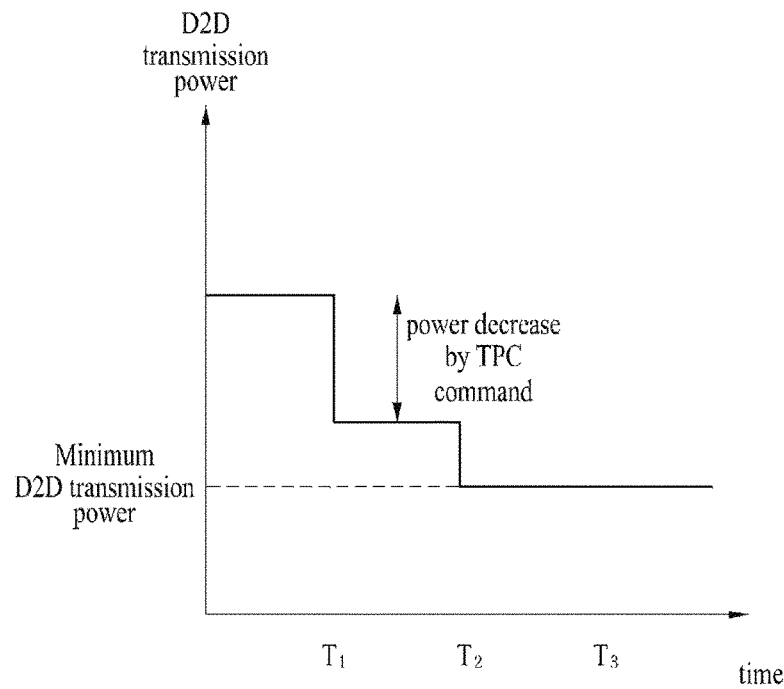
FIG. 8 is a diagram illustrating an example of a configuration of a minimum D2D transmission power in accordance with the embodiment of the present invention.

FIG. 8 is a diagram illustrating an example of a configuration of a minimum D2D transmission power in accordance with the embodiment of the present invention.

Referring to FIG. 8, although the UE has received a TPC command indicating that a power should be reduced as much as a certain size at $T_1$, $T_2$, and $T_3$, the power already reaches the minimum D2D transmission power at $T_2$, whereby the power may not be reduced any more. Alternatively, as a modified operation of FIG. 8, if the eNB follows the TPC command commanded by the eNB and the D2D transmission power becomes the minimum D2D transmission power or less, the eNB may be operated to cancel D2D transmission by regarding the corresponding D2D transmission as meaningless.

Meanwhile, the aforementioned minimum D2D transmission power may be determined by the UE. This case may be more effective in case of unicast for a specific UE only. The transmitting UE may configure a minimum D2D transmission power to obtain communication quality of a desired level by considering an interference level observed by itself or a channel state with the receiving UE. If the eNB knows the minimum D2D transmission power determined by the transmitting UE, since it may assist D2D transmission power control, the UE may report the minimum D2D transmission power determined by itself to the eNB. If the minimum D2D transmission power determined by the UE becomes greater than maximum D2D transmission power granted by the eNB, the UE may stop the corresponding D2D transmission and report, to the eNB, the fact that the minimum D2D transmission power is greater than the maximum D2D transmission granted by the eNB.

Meanwhile, the eNB should identify a power status of each D2D transmitting UE to actively perform D2D transmission power control. Particularly, if the eNB observes strong interference from a D2D signal of a specific UE, although the eNB may command the UE to reduce a transmission power of the corresponding UE, this command may be effective only if the corresponding UE may lower the D2D transmission power. For example, if the minimum D2D transmission power is configured and the corresponding UE transmits a D2D signal at a power similar to the minimum D2D transmission power, the command to lower the transmission power will not be helpful to reduce interference. If the eNB may identify this fact, the eNB may move D2D transmission of the corresponding UE to a resource less susceptible to interference or stop D2D transmission of the corresponding UE and command to switch to WAN communication. To this end, each D2D transmitting UE may report, to the eNB, how much power of the D2D transmission signal may be lowered (hereinafter, this report may be defined as power footroom report).

For example, the UE may calculate a difference between a D2D transmission power currently used by itself (in another sense, used for the latest transmission) and a possible minimum D2D transmission power and report the calculated value to the eNB. As the case may be, the D2D transmission power may be varied even in a state that there is no TPC command from the eNB. For example, a D2D data channel for transmitting user data and a D2D SA (scheduling assignment) channel for transmitting various kinds of information for a subsequent D2D channel may have their respective transmission powers different from each other. In this case, one of the two channels may be a reference (preferably, SA channel having resource waste much more than the other channel due to transmission failure of one time always becomes a reference) or one of the two channels, which has a lower transmission power, may be a reference.

Figure 9:
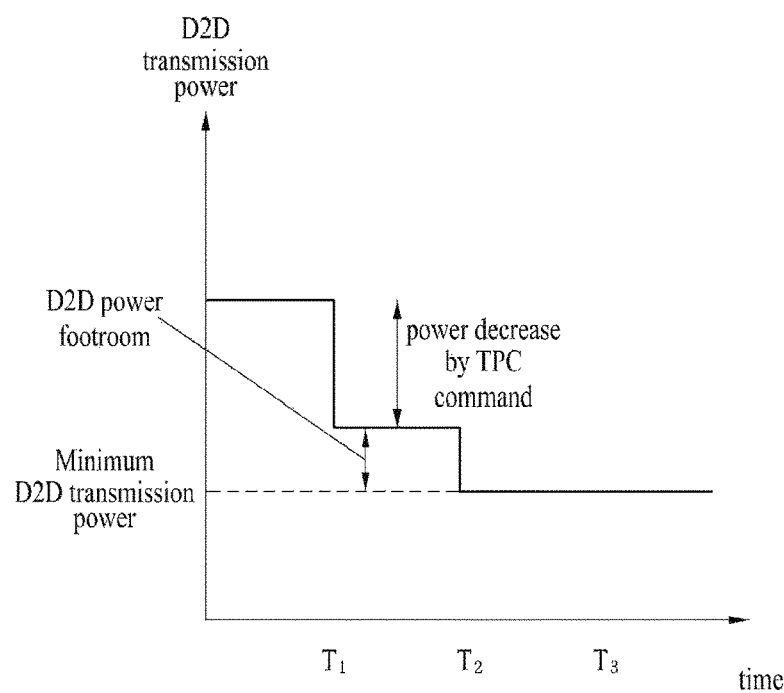
FIG. 9 is a diagram illustrating an example of a power footroom report in an operation of FIG. 8.

FIG. 9 is a diagram illustrating an example of a power footroom report in an operation of FIG. 8.

Referring to FIG. 9, it is noted that a difference between an actual D2D transmission power and a minimum D2D transmission power is reported between $T_1$ and $T_2$ by a power footroom. Additionally, the UE may perform report as to how much power can be lowered while maintaining desired coverage depending on how an MCS used by the UE is varied. The eNB which has received the report may configure a proper MCS.

In calculating the power footroom for D2D communication, the minimum D2D transmission power may mean a minimum power used for actual D2D transmission as shown in the example of FIG. 8 but may be a nominally designated (for example, signaled by the eNB) value for this power footroom report. If the nominal minimum D2D transmission power is given, even though the D2D transmission power indicated by the TPC command from the actual eNB is smaller than the nominal minimum D2D transmission power, the UE is operated to configure the D2D transmission power in accordance with the command of the eNB unlike the operation of FIG. 9.

Figure 10:
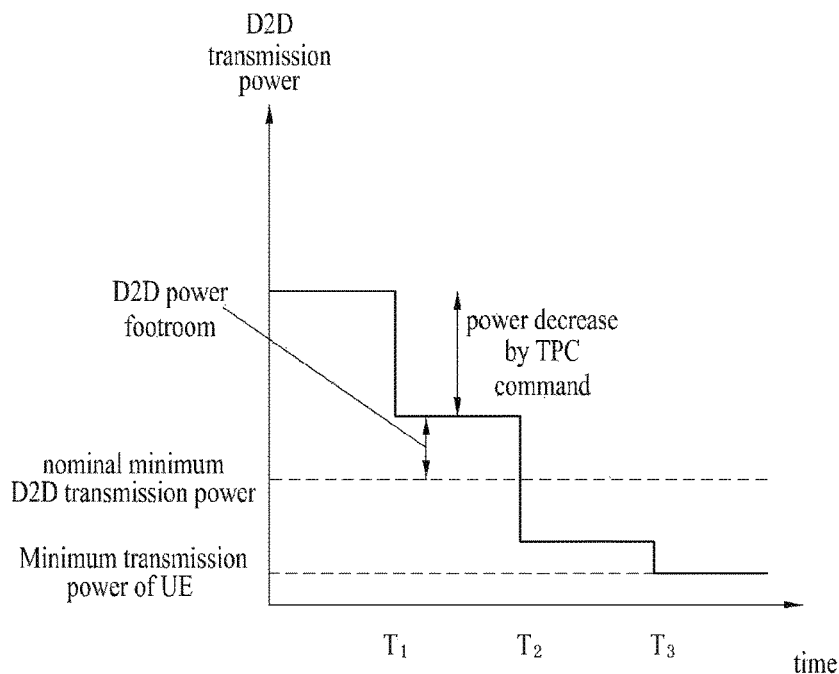
FIG. 10 is a diagram illustrating an example of a power footroom report if a nominal minimum D2D transmission power is given in accordance with the embodiment of the present invention.

FIG. 10 is a diagram illustrating an example of a power footroom report if a nominal minimum D2D transmission power is given in accordance with the embodiment of the present invention.

Referring to FIG. 10, D2D signal transmission of a value smaller than the nominal minimum D2D transmission power occurs in accordance with the TPC command at $T_2$, and the UE which has received the TPC command at $T_3$ reaches the minimum power that can be transmitted by the UE and transmits a D2D signal at the minimum power without lowering the power any more. The nominal minimum D2D transmission power may be configured at the minimum transmission power that can be transmitted by the UE.

The power footroom for the D2D communication is always not reported to the eNB but reported only if a specific condition is satisfied, whereby signaling overhead may be reduced. For example, if the power footroom becomes a certain level or less, this may be reported to the eNB to indicate that the D2D transmission power, which can be lowered, remains a little. Also, if the power footroom is smaller than a certain level and becomes greater than the corresponding level by means of the TPC command, this may be reported to the eNB to indicate that the power footroom is sufficient.

Figure 11:
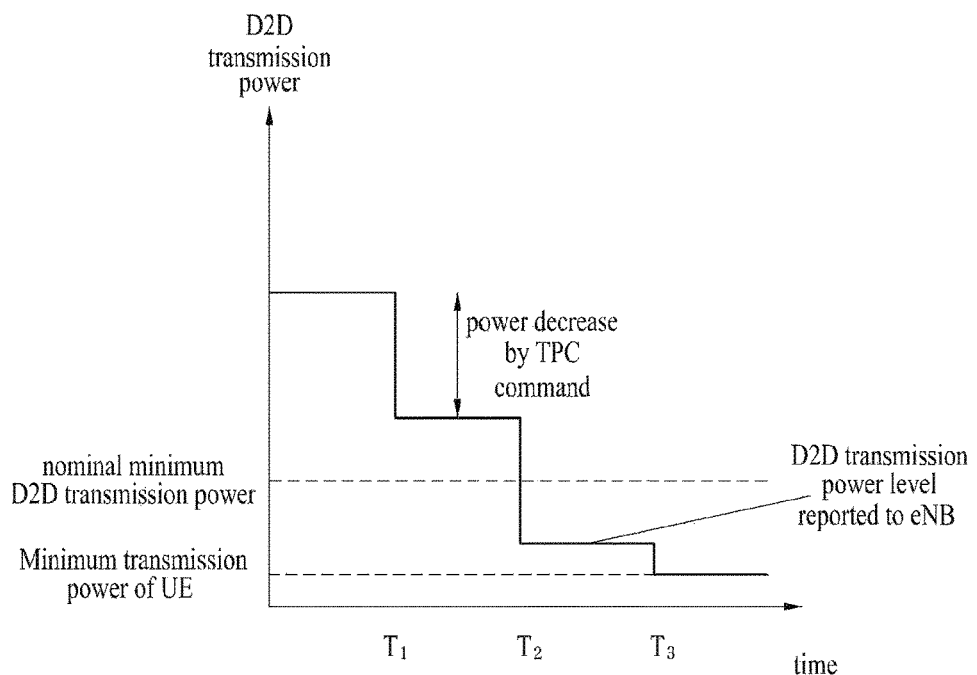
FIG. 11 is a diagram illustrating an example of reporting a D2D transmission power in accordance with the embodiment of the present invention.

As a modification of power footroom report for D2D communication, the D2D transmission power which is currently used may simply be reported instead of the difference with the minimum D2D transmission power. FIG. 11 is a diagram illustrating an example of reporting a D2D transmission power in accordance with the embodiment of the present invention.

Referring to FIG. 11, if the actual D2D transmission power is smaller than the nominal minimum D2D transmission power configured by the eNB, the UE may report the current D2D transmission power to the eNB, and this report operation may be triggered between $T_2$ and $T_3$. Afterwards, the UE may receive the TPC command to increase the D2D transmission power and if the D2D transmission power is greater than the nominal minimum transmission power, and report the fact to the eNB.

Figure 12:
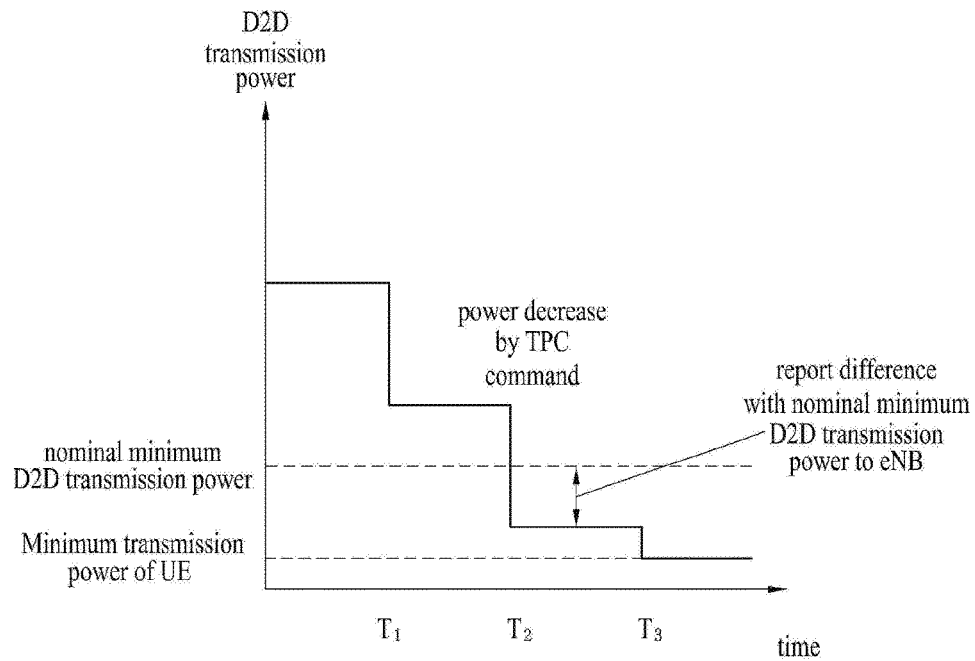
FIG. 12 is a diagram illustrating an example of reporting a difference between a D2D transmission power and a nominal minimum D2D transmission power in accordance with the embodiment of the present invention.

Alternatively, as a modification of the operation described in FIG. 11, if the D2D transmission power is smaller than the nominal minimum D2D transmission power, the UE may report, to the eNB, how the D2D transmission power is smaller than the nominal minimum D2D transmission power. FIG. 12 is a diagram illustrating an example of reporting a difference between a D2D transmission power and a nominal minimum D2D transmission power in accordance with the embodiment of the present invention.

Hereinafter, another example of an operation of controlling a transmission power of D2D communication in an eNB will be described. In this operation, a transmission power value set by the eNB through TPC, etc. means a maximum transmission power that can be used by the UE for D2D transmission at the corresponding timing point, and the actual transmission power used by the UE for various purposes may be a value smaller than that set by the eNB. For example, if there are small data to be transmitted, the transmitting UE may transmit the data at a low MCS and at the same time configure its D2D transmission power to a value smaller than that configured by the eNB to reduce interference on another D2D communication or WAN communication. For another example, the transmitting UE may configure the D2D transmission power to a value smaller than that set by the eNB to reduce its power consumption.

Figure 13:
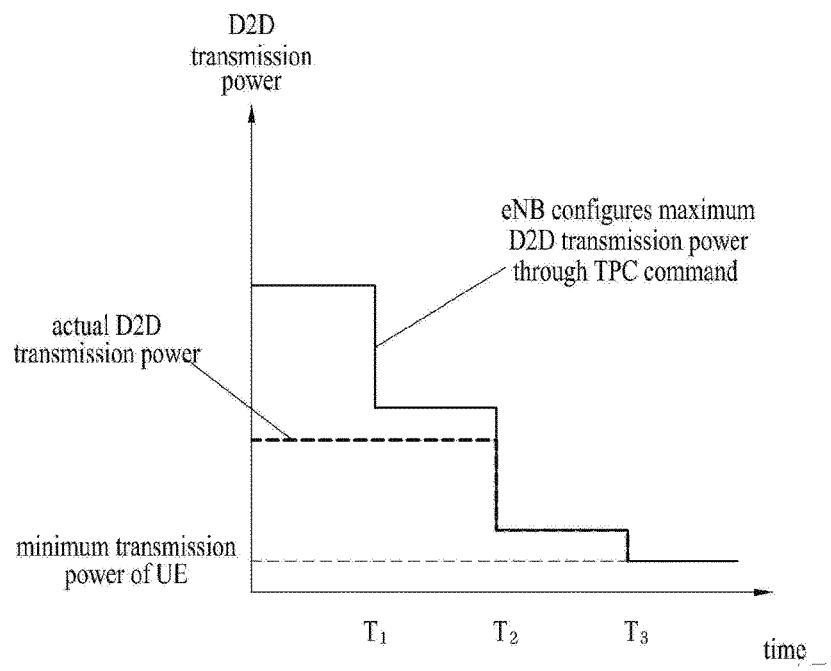
FIG. 13 is a diagram illustrating another example of an operation of controlling a transmission power of D2D communication in an eNB in accordance with the embodiment of the present invention.

FIG. 13 is a diagram illustrating another example of an operation of controlling a transmission power of D2D communication in an eNB in accordance with the embodiment of the present invention.

Referring to FIG. 13, the UE may be configured to receive an upper limit of a transmission power at each transmission timing by receiving a TPC command at three timings $T_1$, $T_2$ and $T_3$, and transmits a D2D signal by selecting a proper transmission power less than the upper limit. Of course, an upper limit set by the eNB may be used. In FIG. 13, it is noted that although the UE uses a transmission power smaller than the upper limit set by the eNB until $T_2$, the maximum value set by the eNB becomes very small after $T_2$, whereby the upper limit is used for actual transmission.

However, the operation of FIG. 13 is effective in that the UE may additionally reduce the D2D transmission power in accordance with its status. However, in view of the eNB, a problem occurs in that it is difficult to predict a level of interference, which may actually occur from the D2D transmission. For example, if a specific UE uses a transmission power lower than the upper limit set by the eNB, the eNB which does not know this, may determine that interference from the corresponding UE is a little and send a TPC command for granting a higher limit. However, if the corresponding UE uses the granted upper limit as it is, the eNB may be affected by unexpected great interference. To solve this problem, even though a D2D UE may autonomically configure a transmission power at a level less than the upper limit set by the eNB, a proper lower limit may be used for the actual transmission power.

In more detail, the eNB may separately set a lower limit of the D2D transmission power, and a power that may be used by the UE for actual transmission may be restricted to exist between an upper limit set by a TPC command and the lower limit set separately. If the upper limit set by the TPC command is smaller than the lower limit set separately, the UE may be operated to stop D2D transmission by determining that D2D transmission is not possible, and may report this fact to the eNB.

Figure 14:
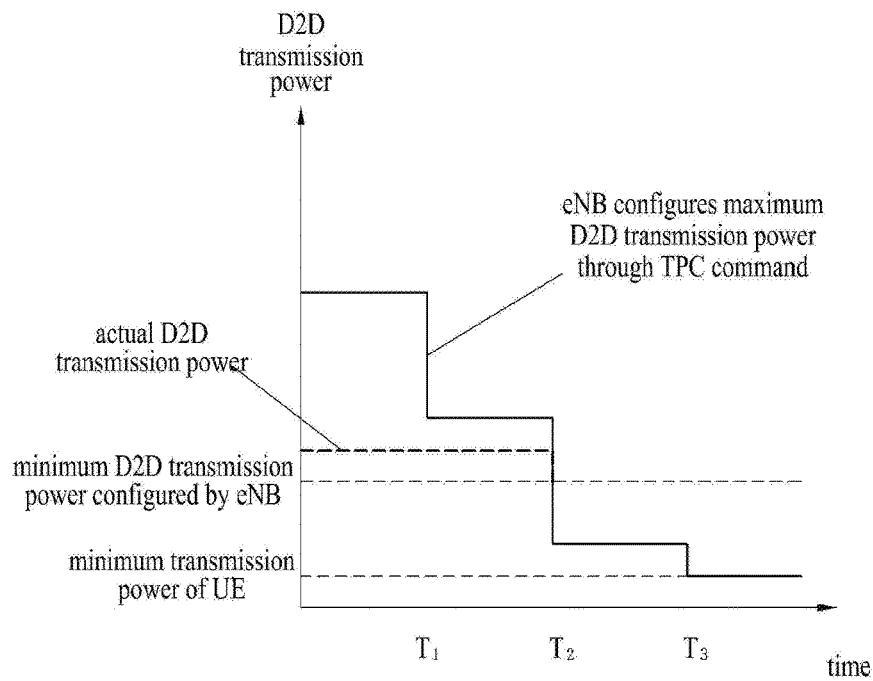
FIG. 14 is a diagram illustrating an example that an upper limit and a lower limit of a D2D transmission power are set in accordance with the embodiment of the present invention.

FIG. 14 is a diagram illustrating an example that an upper limit and a lower limit of a D2D transmission power are set in accordance with the embodiment of the present invention. In the example of FIG. 14, it is noted that the UE stops D2D transmission after $T_2$.

Meanwhile, as another method for setting a proper lower limit to an actual transmission power that may be used by the UE, certain offset may be applied to the upper limit set by the TPC command to derive a lower limit. In this case, the eNB may identify the fact that the UE transmits D2D signal within the corresponding offset based on at least a current TPC command.

Figure 15:
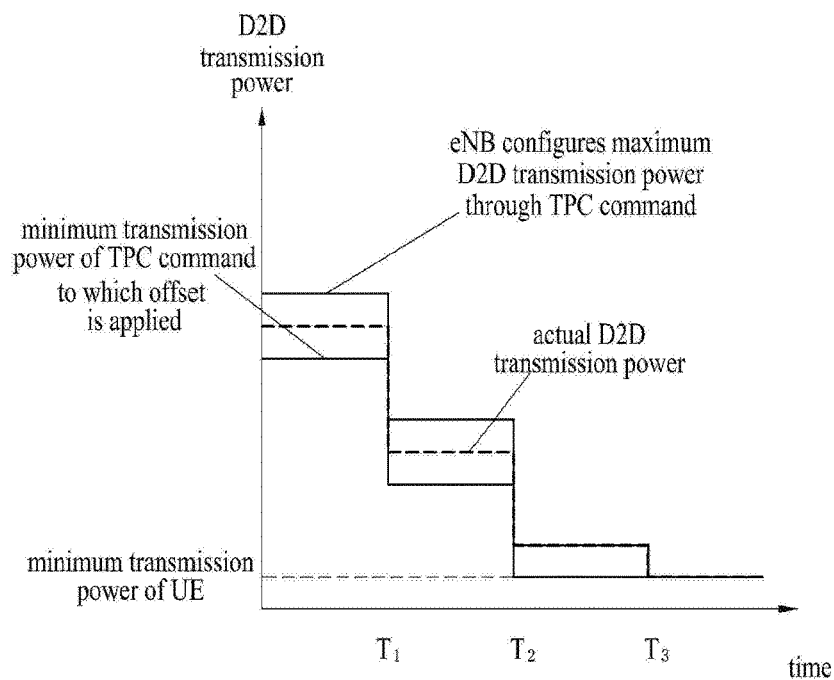
Referring to FIG. 15, it is noted that the UE sets a value, which is set by a TPC command, to an upper limit and sets a value, which is obtained by applying offset to the upper limit, to a lower limit, and selects a transmission power, which will be used for actual D2D transmission, within the set range.

FIG. 15 is a diagram illustrating another example that an upper limit and a lower limit of a D2D transmission power are set in accordance with the embodiment of the present invention.

Referring to FIG. 15, it is noted that the UE sets a value, which is set by a TPC command, to an upper limit and sets a value, which is obtained by applying offset to the upper limit, to a lower limit, and selects a transmission power, which will be used for actual D2D transmission, within the set range.

Additionally, in receiving a TPC command to increase the D2D transmission power from the eNB and construing the TPC command, the UE may be operated to update the upper limit of the D2D transmission power only if a value obtained by adding an increment by the TPC command to the actual transmission power exceeds the upper limit set by the eNB.

In more detail, the upper limit of the D2D transmission power at a time i+1 may be given by the following Equation 5.

$$P_{D2D,max}(i+1)\max\{P_{D2D,max}(i),P_{D2D,used}(i)+TPC(i)\} \quad [\text{Equation 5}]$$

In the Equation 5, $P_{D2D,used}(i)$ means a power value used for actual D2D at a time i or means a power used for D2D transmission prior to a time closest to the corresponding time if there is no D2D transmission at the time i. Also, TPC(i) corresponds to a power increment by the TPC command received at the time i. Particularly, since TPC(i) corresponds to the TPC command to increase the power, a condition of TPC(i)≥0 is satisfied. Finally, the upper limit of D2D can be controlled based on the current D2D transmission power in accordance with the Equation 5.

Meanwhile, if the eNB commands to reduce the D2D transmission power through the TPC command, this may be regarded that the eNB determines that interference from the actual D2D transmission power is excessive. Therefore, the upper limit of the D2D signal is updated based on the actual D2D transmission power not the existing upper limit. In more detail, the upper limit of the D2D transmission at the time i+1 may be given by the following Equation 6.

$$P_{D2D,max}(i+1)=P_{D2D,used}(i)+TPC(i) \quad [\text{Equation 6}]$$

In the Equation 6, TPC(i) corresponds to a power increment by the TPC command received at the time i. Particularly, since TPC(i) corresponds to the TPC command to reduce the power, a condition of TPC(i)<0 is satisfied.

According to the characteristic of the aforementioned D2D transmission power control, it is important to control a power of the D2D signal to reduce interference on WAN. Therefore, it is more important to reduce the power than to increase the power in configuring the TPC command. This is to allow the eNB to quickly reduce a D2D power of a specific D2D UE if interference caused by the corresponding UE is very great. For example, for a TPC for WAN transmission, much more states of various states that may be indicated as the TPC command may be allocated to reduce the power or an interval size for reducing the transmission power may be more increased.

The following Table 6 is an example indicating a D2D transmission power control value if a TPC command of 2 bits is used. Alternatively, a transmission power control value, which will be used in each state of the TPC command for D2D, may be configured by a higher layer signal such as RRC to reflect various requests.

TABLE 6

| TPC Command Field in DCI controlling D2D transmissions | Accumulated $\delta_{PUSCH,c}$ [dB] | Absolute $\delta_{PUSCH,c}$ [dB] |
|---|---|---|
| 0 | −3 | −7 |
| 1 | −1 | −4 |
| 2 | 0 | −1 |
| 3 | 1 | 1 |

To control the D2D transmission power more actively, more bits than those in WAN communication may be allocated as the D2D TPC command. In this case, more states may be allocated to reduce the power. For example, if a TPC command of 3 bits is included in DCI for controlling D2D transmission as illustrated in Table 7 below, more states may be used as a command to reduce the power.

TABLE 7

| TPC Command Field in DCI controlling D2D transmissions | Accumulated $\delta_{PUSCH,c}$ [dB] | Absolute $\delta_{PUSCH,c}$ [dB] |
|---|---|---|
| 0 | −7 | −16 |
| 1 | −5 | −13 |
| 2 | −3 | −10 |
| 3 | −1 | −7 |
| 4 | 0 | −4 |
| 5 | 1 | −1 |
| 6 | 3 | 1 |
| 7 | 5 | 4 |

Meanwhile, the aforementioned TPC command may be transmitted as a partial field of a D2D grant for transmitting various commands from the eNB to a D2D transmitting UE. The TPC command is transmitted through a PDCCH or EPDCCH (Enhanced PDCCH). At this time, one transmitting UE may transmit a D2D signal to a plurality of UEs (or a plurality of UE groups) as receiving targets. For example, UE1 may respectively transmit different D2D signals to UE2 and UE3 in accordance with the command received through the D2D grant. At this time, various kinds of information of the D2D grant commanded by the eNB may be varied depending on the receiving UE. For example, if the UE2 is close to the UE1, the amount of resources used for transmission to the UE2 and the transmission power are reduced, whereas more resources may be used if the UE3 is far away from the UE1.

To implement the above operation, information of the UE which is a receiving target when the D2D signal is transmitted using the D2D grant may be included in the D2D grant. For example, the D2D grant includes a specific indicator, which may indicate the D2D grant used when the D2D signal is transmitted to the corresponding UE of the UE2 and the UE3. In this case, if UEs which are receiving targets are different from each other as the corresponding indicators are different from each other, proper transmission powers are different from each other, whereby it is preferable to manage TPCs respectively.

Additionally, the eNB may separately indicate maximum/minimum D2D transmission powers and power control parameters, which will be used in each indicator (that is, receiving UE group corresponding to indicators), through a higher layer signal such as RRC signal, and may be operated to perform measurement and report of a power footroom separately for each receiving UE group.

Hereinafter, minimum D2D transmission power configuration for assuring minimum coverage of the aforementioned D2D communication will be described in more detail.

Minimum coverage of each D2D communication may be varied depending on a service from a corresponding transmitting UE. For example, if the UE transmits a discovery signal indicating its presence, the UE1 may want UEs which are very close to the UE1 to discover itself, whereas the UE2 may want UE which is relatively far away from the UE2 to discover itself. This means that minimum coverage in a discovery signal of the UE1 is different from minimum coverage in a discovery signal of the UE2. Therefore, minimum transmission powers of the discovery signals of the two UEs may be configured separately.

Although the eNB may separately signal the minimum transmission powers by considering minimum coverage of the D2D signal of each UE, a UE-specific signal may not be available in case of some D2D signal, for example, D2D signal transmitted by the UE as the UE autonomically selects a specific resource within a resource pool configured by the eNB for a plurality of unspecified UEs. At this time, the eNB may respectively configure the resource pools in accordance with coverage to be assured, and may configure a minimum transmission power matched with coverage assured for each resource pool. However, if a specific UE uses an excessively high transmission power in a specific resource pool, since excessive interference may be caused in the other UEs, a maximum transmission power may be configured for target coverage of each resource pool.

This means that target coverage of the D2D signal is represented by a kind of transmission power period expressed as a minimum transmission power and/or maximum transmission power, and transmission powers of different periods are used in different resource pools to easily provide target coverage in each period.

Figure 16:
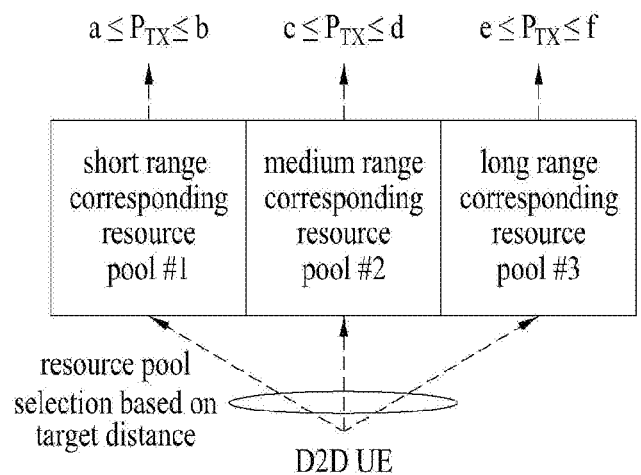
FIG. 16 is a diagram illustrating an example that transmission powers of different periods are used for each of resource pools for D2D communication in accordance with the embodiment of the present invention.

FIG. 16 is a diagram illustrating an example that transmission powers of different periods are used for each of resource pools for D2D communication in accordance with the embodiment of the present invention.

Referring to FIG. 16, it is noted that a total of three resource pools are configured and respectively targeted for a short range, a medium range and a long range. Also, relations of $a \le c \le e$ and $b \le d \le f$ may be configured between minimum and maximum D2D transmission powers of each resource pool.

In this way, as an example of minimum/maximum D2D transmission power interworking with coverage targeted by D2D communication, a nominal D2D transmission power corresponding to D2D coverage may be configured, and a resource pool of a transmission power area, which includes the corresponding nominal D2D transmission power, may be used by the UE.

As another example, the nominal D2D transmission power may be configured in each resource pool, and a UE, which transmits a D2D signal of the corresponding nominal D2D transmission power, selects a corresponding resource pool, and the UE may be operated such that the minimum/maximum D2D transmission power in the corresponding resource pool may be derived from the nominal D2D transmission power. For example, the minimum D2D transmission power and the maximum D2D transmission power may be determined to reach nominal powers, $X(\le 100)\%$ and $Y(\ge 100)\%$, respectively.

Distinctively, since the nominal power is the minimum D2D transmission power, the UE may be operated such that coverage provided when the nominal D2D transmission power is transmitted becomes minimum coverage.

Afterwards, if the UE selects a specific resource pool which will be used for D2D signal transmission, the minimum and/or maximum power of the UE is determined, and the UE perform D2D power control and determines a final D2D transmission power in accordance with the aforementioned operation within the corresponding area. In this case, it is preferable that various power control parameters applied in each resource pool, for example, weight values which are multiplied by pathloss with the eNB are set separately. Also, the number of times for repeated transmission of the same D2D signal may be configured appropriately in each resource pool based on coverage targeted by D2D communication. This is because that coverage becomes wide even though the same power is used if the same D2D signal is transmitted more times.

Referring to the Equation 1, if the number of resource blocks reserved by the D2D signal such as the discovery signal of D2D communication or a modulation mode used by the D2D signal is fixed and there is no TPC command of the eNB $P_{O\_PUSCH,c}(i)$, is the minimum D2D transmission power configured by the eNB, and the UE transmits the D2D signal at a power more than the minimum power in accordance with pathloss with the eNB within the range of the determined maximum power $P_{CMAX,c}(i)$. Therefore, the method for configuring D2D coverage for each resource pool and determining a separate minimum/maximum transmission power for each pool as shown in FIG. 16 may be implemented in such a manner that a value corresponding to $P_{O\_PUSCH,c}(j)$ and a value corresponding to $P_{CMAX,c}(i)$ are configured separately for each pool.

Figure 17:
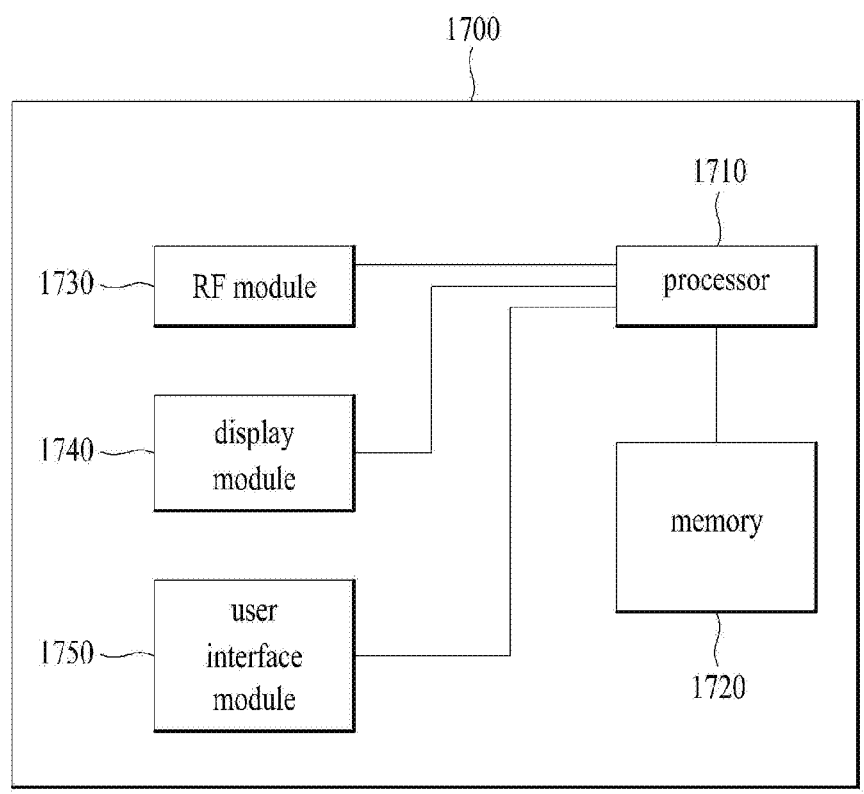
FIG. 17 is a block diagram illustrating a communication device according to embodiments of the present invention.

FIG. 17 is a block diagram of a communication apparatus according to an embodiment of the present invention.

Referring to FIG. 17, a communication device 1700 includes a processor 1710, a memory 1720, a radio frequency (RF) module 1730, a display module 1740, and a user interface (UI) module 1750.

The communication device 1700 is illustrated for convenience of description and some modules may be omitted. The communication device 1700 may further include necessary modules. Some modules of the communication device 1700 may be further divided into sub-modules. The processor 1700 is configured to perform operations according to the embodiments of the present invention exemplarily described with reference to the drawings. Specifically, for a detailed description of operations of the processor 1700, reference may be made to the description described with reference to FIGS. 1 to 16.

The memory 1720 is connected to the processor 1710 and stores operating systems, applications, program code, data, and the like. The RF module 1730 is connected to the processor 1710 and performs a function of converting a baseband signal into a radio signal or converting a radio signal into a baseband signal. For this, the RF module 1730 performs analog conversion, amplification, filtering, and frequency upconversion or performs inverse processes thereof. The display module 1740 is connected to the processor 1710 and displays various types of information. The display module 1740 may include, but is not limited to, a well-known element such as a liquid crystal display (LCD), a light emitting diode (LED), or an organic light emitting diode (OLED). The UI module 1750 is connected to the processor 1710 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method for determining a transmission power for direct device to device communication in a wireless communication system and the aforementioned apparatus therefor have been described based on the 3GPP LTE system, the method and apparatus may be applied to various wireless communication systems in addition to the 3GPP LTE system.

The invention claimed is:

1. A method for performing power reporting from a UE to an eNB for a device to device (D2D) communication in a wireless communication system, the method comprising:
receiving a transmit power control (TPC) command for the D2D communication from the eNB;
selecting a resource pool of a plurality of resource pools for the D2D communication according to a service provided by the D2D communication;
transmitting a D2D signal by determining a transmission power of the D2D communication in accordance with the TPC command using the selected resource pool; and
reporting a difference between the determined transmission power and a minimum D2D transmission power of the UE to the eNB,
wherein the minimum D2D transmission power is configured independently for each of the plurality of resource pools for the D2D communication, based on the service provided by the D2D communication.

2. The method according to claim 1, wherein:
the minimum D2D transmission power is received from the eNB, and
the minimum D2D transmission power is greater than a minimum uplink transmission power of the UE.

3. The method according to claim 1, wherein the TPC command indicates a power increase and decrease based on a current transmission power, and the power increase and decrease indicated by the TPC command for the D2D communication is greater than a power increase and decrease indicated by a TPC command for an uplink communication between the UE and the eNB.

4. A user equipment (UE) for performing a device to device (D2D) communication in a wireless communication system, the UE comprising:
a wireless transceiver for transmitting and receiving a signal to and from another UE or an eNB; and
a processor for processing the signal,
wherein the processor controls the wireless transceiver to select a resource pool of a plurality of resource pools for the D2D communication according to a service provided by the D2D communication, transmit a D2D signal using the selected resource pool by determining a transmission power of the D2D communication in accordance with a transmit power control (TPC) command for the D2D communication, which is received from the eNB, and report a difference between the determined transmission power and a minimum D2D transmission power of the UE to the eNB, wherein the minimum D2D transmission power is configured independently for each of the plurality of resource pools for the D2D communication, based on the service provided by the D2D communication.

5. The UE according to claim 4, wherein:

the minimum D2D transmission power is received from the eNB, and the minimum D2D transmission power is greater than a minimum uplink transmission power of the UE.

6. The UE according to claim 4, wherein the TPC command indicates a power increase and decrease based on a current transmission power, and the power increase and decrease indicated by the TPC command for the D2D communication is greater than a power increase and decrease indicated by a TPC command for an uplink communication between the UE and the eNB.

\* \* \* \* \*